United States Patent
Bulgajewski et al.

(10) Patent No.: US 10,236,544 B2
(45) Date of Patent: Mar. 19, 2019

(54) HEATER FOR ELECTRIC VEHICLE BATTERIES

(71) Applicant: ILLINOIS TOOL WORKS INC., Glenview, IL (US)

(72) Inventors: Edward F. Bulgajewski, Genoa, IL (US); Uwe Stapf, Roettingen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/302,572

(22) PCT Filed: Apr. 3, 2015

(86) PCT No.: PCT/US2015/024238
§ 371 (c)(1),
(2) Date: Oct. 7, 2016

(87) PCT Pub. No.: WO2015/157106
PCT Pub. Date: Oct. 15, 2015

(65) Prior Publication Data
US 2017/0025722 A1   Jan. 26, 2017

Related U.S. Application Data

(60) Provisional application No. 61/977,802, filed on Apr. 10, 2014.

(51) Int. Cl.
*H01M 10/6553* (2014.01)
*H01M 10/625* (2014.01)
(Continued)

(52) U.S. Cl.
CPC ... *H01M 10/6553* (2015.04); *H01M 10/0525* (2013.01); *H01M 10/615* (2015.04); *H01M 10/625* (2015.04); *H01M 10/637* (2015.04); *H01M 10/647* (2015.04); *H01M 10/653* (2015.04); *H01M 10/6571* (2015.04);
(Continued)

(58) Field of Classification Search
None
See application file for complete search history.

(56) References Cited

U.S. PATENT DOCUMENTS 4,255,698 A   3/1981  Simon
4,857,711 A   8/1989  Watts
(Continued)

FOREIGN PATENT DOCUMENTS

CN   103259036 A   9/2012
CN   102868005 A   1/2013
(Continued)

OTHER PUBLICATIONS

ISR and WO for PCT/US2015/024238 mailed Aug. 19, 2015.

*Primary Examiner* — Wyatt P McConnell
(74) *Attorney, Agent, or Firm* — Joseph M. Butscher; The Small Patent Law Group, LLC

(57) ABSTRACT

A battery pack assembly interleaves pouch cells with thin flexible heater elements to provide for distributed low-power heating with reduced thermal resistance between the heater elements and the cells. The heater elements may include terminals for direct attachment to pouch cell electrodes and to each other to facilitate power distribution among the heater elements.

19 Claims, 5 Drawing Sheets

(51) Int. Cl.
*H01M 10/615* (2014.01)
*H01M 10/637* (2014.01)
*H01M 10/653* (2014.01)
*H01M 10/647* (2014.01)
*H01M 10/6571* (2014.01)
*H05B 3/14* (2006.01)
*H05B 3/56* (2006.01)
*H01M 10/0525* (2010.01)
*H05B 3/54* (2006.01)

(52) U.S. Cl.
CPC ............ *H05B 3/146* (2013.01); *H05B 3/54* (2013.01); *H05B 3/56* (2013.01); *H01M 2200/106* (2013.01); *H01M 2200/20* (2013.01); *H01M 2220/20* (2013.01); *H05B 2203/005* (2013.01); *H05B 2203/011* (2013.01); *H05B 2203/013* (2013.01)

(56) References Cited

U.S. PATENT DOCUMENTS

| | | |
|---|---|---|
| 4,931,627 A | 6/1990 | Watts |
| 5,689,173 A | 11/1997 | Oosaki et al. |
| 6,426,485 B1 | 7/2002 | Bulgajewski et al. |
| 6,479,185 B1 | 11/2002 | Hilderbrand et al. |
| 6,479,187 B1 | 11/2002 | Takasaki et al. |
| 6,674,392 B1 | 1/2004 | Schmidt et al. |
| 7,262,388 B2 | 8/2007 | Moreth et al. |
| 8,283,612 B2 | 10/2012 | Keite-Telgenbuescher et al. |
| 8,367,986 B2 | 2/2013 | Von Wachenfeldt et al. |
| 8,383,997 B2 | 2/2013 | Keite-Telgenbuescher et al. |
| 8,574,738 B2 | 11/2013 | Fattig |
| 8,675,449 B2 | 3/2014 | Mielenz |
| 8,916,799 B2 | 12/2014 | Martinez et al. |
| 2005/0242782 A1 | 11/2005 | Kadouchi et al. |
| 2006/0086710 A1 | 4/2006 | Meiler et al. |
| 2007/0164011 A1 | 7/2007 | Bulgajewski |
| 2009/0253028 A1 | 10/2009 | Takagi |
| 2011/0117463 A1 | 5/2011 | Lienkamp et al. |
| 2011/0210703 A1 | 9/2011 | Souza et al. |
| 2011/0300421 A1* | 12/2011 | Iritani ................. H01M 10/625 429/72 |
| 2012/0168420 A1 | 7/2012 | Ogino et al. |
| 2012/0189881 A1 | 7/2012 | Geoffroy et al. |
| 2012/0263987 A1 | 10/2012 | Buckley et al. |
| 2013/0108896 A1 | 5/2013 | Daniel et al. |
| 2013/0220994 A1 | 8/2013 | Hanada et al. |
| 2013/0241408 A1 | 9/2013 | Sasaki et al. |
| 2014/0353392 A1 | 12/2014 | Part et al. |
| 2015/0090426 A1 | 4/2015 | Hirsch et al. |
| 2015/0090427 A1 | 4/2015 | Brandauer et al. |

FOREIGN PATENT DOCUMENTS

| | | |
|---|---|---|
| CN | 102683766 A | 8/2013 |
| DE | 3340882 C1 | 6/1985 |
| DE | 10018456 A1 | 10/2001 |
| DE | 10346270 | 7/2004 |
| DE | 102009047647 A1 | 6/2011 |
| DE | 102010010144 A1 | 9/2011 |
| DE | 102010013026 A1 | 9/2011 |
| DE | 102013012517 A1 | 3/2014 |
| DE | 102013012164 A1 | 1/2015 |
| DE | 202013007801 U1 | 1/2015 |
| EP | 0761500 A1 | 3/1997 |
| EP | 2456003 A1 | 5/2012 |
| JP | 03134580 A | 6/1991 |
| JP | 07050157 A | 2/1995 |
| JP | 2012033351 A | 2/2012 |
| JP | 2012243535 A | 12/2012 |
| KR | 20120053596 A | 5/2012 |
| WO | 2012120089 A1 | 9/2012 |
| WO | 2012153230 A1 | 11/2012 |
| WO | 2012153230 A1 | 11/2012 |
| WO | 2014131737 A1 | 9/2014 |

* cited by examiner

HEATER FOR ELECTRIC VEHICLE BATTERIES

CROSS-REFERENCE TO RELATED APPLICATIONS

This application is a National Phase of International Application No. PCT/US2015/024238, filed Apr. 3, 2015, and claims the benefit of U.S. provisional application 61/977,802 filed Apr. 10, 2014, and hereby incorporated by reference.

FIELD OF THE INVENTION

The present invention relates to electrical batteries and in particular to electrical batteries used for vehicular enemy storage.

BACKGROUND OF THE INVENTION

Electric vehicles and hybrid electric vehicles make use of batteries for energy storage. In this application, the batteries may be subject to a range of storage temperatures including subzero temperatures. At low temperatures, the available power for many types of batteries, including lithium ion batteries, is substantially reduced and the battery efficiency decreased.

SUMMARY OF THE INVENTION

The present invention provides a heater fig electric vehicle batteries that can be applied directly to the flat film walls of an individual "pouch cell", the latter of which are assembled together in a compact stack to provide a battery of suitable voltage. By attaching a thin heating element directly to the pouch wall, the volume of heater structure is substantially reduced with a corresponding reduction in cost and weight. Equally important, heat may be applied locally to each cell to rapidly warm the battery in a way that would be difficult with a heater external to the battery subject to a larger isolating thermal resistance. Each heater may include a thermostatic control to substantially eliminate hot spots that might otherwise be expected to develop based on the different locations of the cells within the battery.

In one embodiment, the invention provides a battery pack assembly including at least one pouch cell providing opposed polymeric film walls holding battery electrodes and providing exposed battery terminals. A flexible film heater having exposed heater terminals is applied in thermal contact to at least one polymeric film wall to heat the same when the current passes between the heater terminals.

It is thus a feature of at least one embodiment of the invention to provide a compact heater with reduced structure that may be placed in direct contact with the walls of the pouch cell.

The battery pack assembly may include multiple pouch cells each having an attached flexible film heater and stacked so that each pouch cell contacts a flexible film heater on both opposed polymeric film walls and so that at least one film heater contacts two adjacent pouch cells.

It is thus a feature of at least one embodiment of the invention to provide a compact heater structure that may be interleaved with pouch cells to reduce the thermal resistance between the heater and the battery components.

The exposed heater terminals for successive film heaters may extend generally along the plane of the film heater at different locations for different film heaters so heater terminals of the first film heater may attach to the battery terminals of an adjacent pouch cell and heater terminals of other film heaters may wrap around pouch cells to attach to an adjacent film heater without contacting other heater terminals.

It is thus a feature of at least one embodiment of the invention to permit the film heaters to be flexibly connected in series or parallel to provide the desired trade-off between resistance and power dissipation.

The exposed heater terminals overlie and contact the battery terminals.

It is thus a feature of at least one embodiment of the invention to permit the film heaters to piggyback on the electrical distribution conductors for the pouch cells.

The battery terminals may be disposed along a seam between the opposed polymeric film walls to extend generally parallel to the polymeric film walls, and the exposed heater terminals may extend along a plane of the flexible film heater to overlie and contact the battery terminals.

It is thus a feature of at least one embodiment of the invention to provide an attachment mechanism between the film heater and the pouch cells that works with standard pouch cell designs having extended tab terminals.

The exposed heater terminals may be flexible and coated with a conductive adhesive for attachment to the battery terminals.

It is thus a feature of at least one embodiment of the invention to provide a simple attachment mechanism between the pouch cell terminals and the film heater terminals that works with existing pouch cell designs.

The film heater may employ a positive temperature coefficient material.

It is thus a feature of at least one embodiment of the invention to provide a simple method of thermoregulation that is responsive to different temperatures that may exist within a bank of pouch cells.

Alternatively, the film heater may provide a thermostatic element switching current through the film heater according to a temperature of the film heater.

It is thus a feature of at least one embodiment of the invention to provide a thermoregulation that fully removes the heater load from the battery at threshold temperatures.

The thermostatic element may be selected from a bimetallic element and a memory metal element.

It is thus a feature of at least one embodiment of the invention to provide a low-cost thermostat system suitable for film heaters.

The film heater may provide a set of polymeric conductors extending between flanking distribution conductors extending along edges of the pouch cells in the assembled battery pack assembly, and the distribution conductors may be flexible metallic films or foil.

It is thus a feature of at least one embodiment of the invention to provide a high-power dissipation heater by parallel connection of polymeric conductors.

The width of the distribution conductors at a point along the distribution conductors may be proportional to a sum of the widths of the polymeric conductors joined by the distribution conductors downstream from that point with respect to the battery terminals.

It is thus a feature of at least one embodiment of the invention to minimize material costs for distribution of current among the polymeric conductors while promoting uniform heating over the surface of the film heater.

The film heater may provide an electrically insulating polymer film substrate to which the film heater is attached.

It is thus a feature of at least one embodiment of the invention to permit the addition of film heaters to existing pouch cell designs.

In this case, the polymeric substrate may be coated with a pressure sensitive adhesive for attachment to a polymeric film wall.

It is thus a feature of at least one embodiment of the invention to provide a simple method of integrating the film heaters into a battery pack while ensuring close thermal proximity with the flexible polymeric film walls of the pouch cell.

Alternatively, the film heater may provide a conductive material adhered directly to the polymeric film wall, for example, by direct printing.

It is thus a feature of at least one embodiment of the invention to minimize the structure of the film heater by employing the outer polymeric film wall of the pouch cell for reduced weight and cost.

The pouch cells may be lithium ion batteries.

It is thus a feature of at least one embodiment of the invention to permit on-demand, cold-weather operation of standard lithium-ion batteries used in hybrid vehicles and the like.

Other features and advantages of the invention will become apparent to those skilled in the art upon review of the following detailed description, claims and drawings in which like numerals are used to designate like features.

Figure 1:
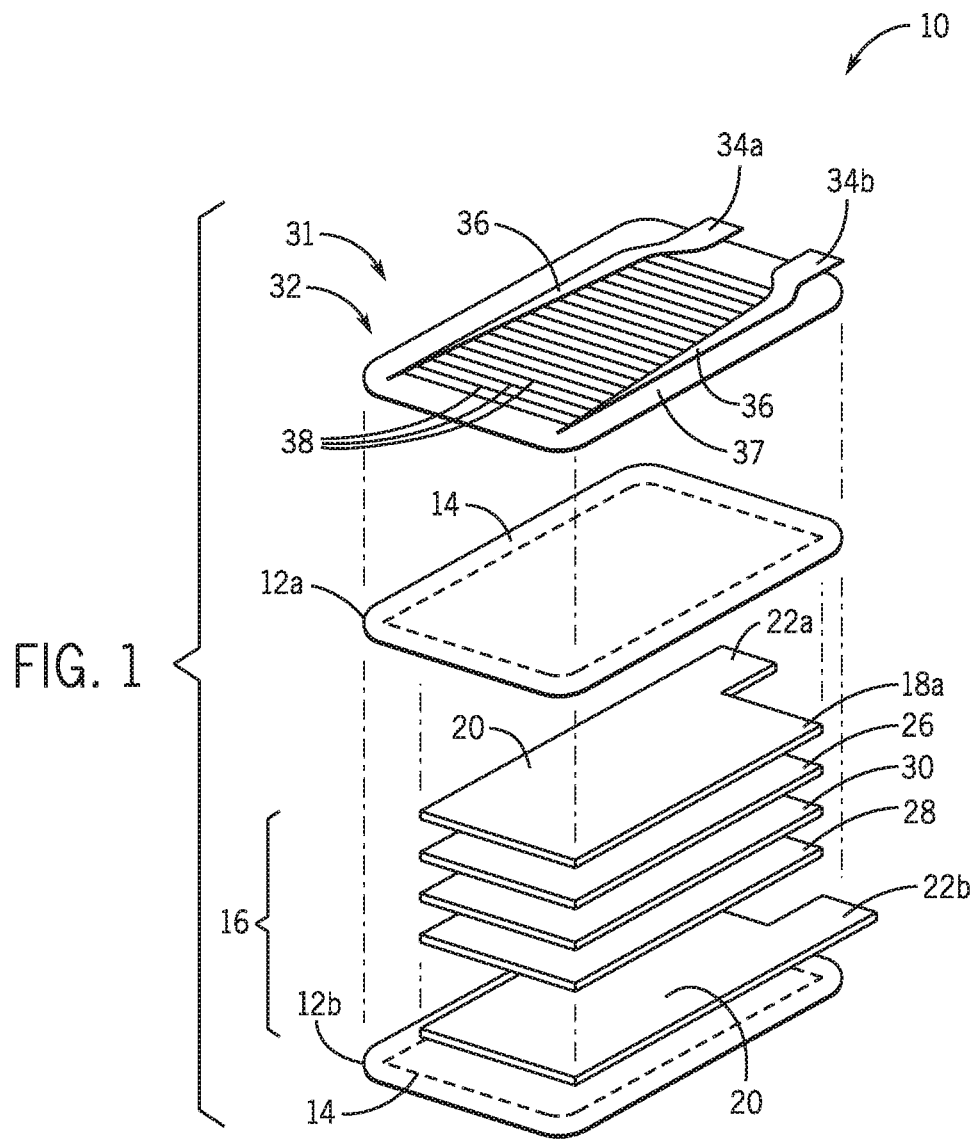
FIG. 1 is an exploded perspective view of a pouch cell having an integrated heater element attached to the cell wall according to the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a pouch cell 10, suitable for assembly into a battery for use in an electric vehicle such as a car or the like, may have a generally flattened prismatic form factor having upper and lower rectangular pouch walls 12a and 12b. The upper and lower rectangular pouch walls 12a and 12b will typically be constructed of a flexible, insulating polymer sheet that may be heat-sealable around a seam periphery 14 to provide a pouch defining an enclosed volume 16.

The enclosed volume 16 may hold various plates, separators, and electrolytes selected to provide electrochemical storage and release electrical power. Specifically, the volume 16 may hold an upper current collector plate 18a such as a metal foil or other conductor having a plate section 20 to tit within the volume 16 and an extending tab electrode 22a to project beyond the seam periphery 14 of the upper and lower rectangular pouch walls 12a and 12b for external connection to the upper current collector plate 18a. The upper current collector plate 18a will be positioned adjacent to the upper rectangular pouch wall 12a.

A similar, lower collector plate 18b may be positioned adjacent to the lower rectangular pouch wall 12b and may likewise have a plate section 20 fitting within the volume 16 and tab electrode 22b projecting beyond the seam periphery 14 and displaced from the tab electrode 22a, for example, on opposite left and right sides of one edge of the seam periphery 14.

The upper and lower collector plates 18a and 18b may flank a stack comprising a negative electrode material 26 adjacent to the upper current collector plate 18a, a positive electrode material 28 adjacent to the lower current collector plate 18b, and a separator 30 between the negative electrode material 26 and the positive electrode material 28. Generally an individual pouch cell 10 will hold a single positive electrode material 28 and negative electrode material 26.

Construction of a pouch cell as described above may be according to the description of US patent application 2012/0263987 entitled "High-Energy Lithium-Ion Secondary Batteries" assigned to Envia Systems. Inc. and hereby incorporated by reference.

Figure 2:
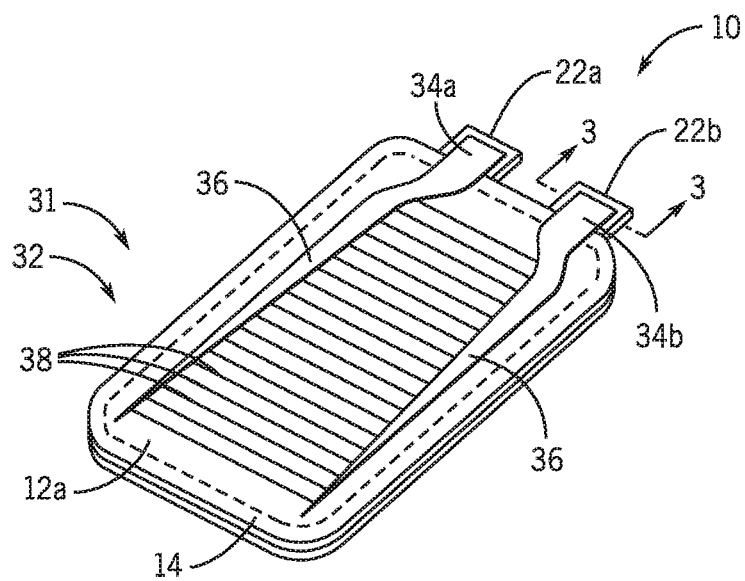
FIG. 2 is a figure similar to that of FIG. 1 showing a fully assembled pouch cell.

Referring now to FIGS. 1 and 2, attached to the outer upper surface of the upper rectangular pouch wall 12a may be an electrical resistance heater 31 in the form of an electrode array 32. The electrode array 32 has attachment tabs 34a and 34b aligned with and attached to electrodes 22a and 22b, respectively (as will be described in detail below). The attachment tabs 34a and 34b lead to left and right power rails 36 extending along the full length of two opposed sides of the upper rectangular pouch wall 12a having a planar extent that narrows as one moves away from the attachment tabs 34a and 34b. Left and right power rails 36 may be, for example, a metal foil or metalized layer or other conductive material.

Spanning heater conductors 38 extend between the left and right power rails 36 like rungs of a ladder to provide a path of current flow between attachment tab 34a and 34b. Generally, a width of the left and right power rails can be made proportional to the sum of the widths of all downstream spanning heater conductors 38 so that the left and right power rails 36 become narrower as they proceed away from the attachment tabs 34.

The electrode array 32 may be constructed, for example, of a high resistance conductive material providing low current draw and generating heat over the entire surface of the upper rectangular pouch wall 12a. Preferably, the spanning heater conductors 38 are polymer heaters being, for example, a conductive polyester material exhibiting a positive temperature coefficient (PTC) to provide for temperature driven current limiting and thus a first level of temperature feedback preventing hotspots when the pouch cells 10 are assembled together into a battery. Positive temperature coefficient (PTC) heaters, suitable for the present invention, are also disclosed in U.S. Pat. Nos. 4,857,711 and 4,931,627 to Leslie M. Watts hereby incorporated in their entireties by reference.

The electrode array 32 may be printed directly on the upper rectangular pouch wall 12a or die cut and adhered on the upper rectangular pouch wall 12a using well-understood techniques. Conductive polymers may, for example, be polymers having fine particulate filler of a conductive material such as silver.

The power rails 36 and spanning heater conductors 38 may be supported on a flexible insulating polymer carrier layer 37.

Figure 3:
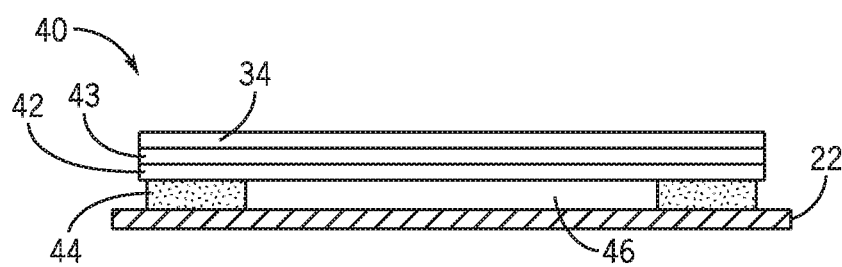
FIG. 3 is a cross-sectional view through a tab electrode of the pouch cell showing a thermostatic control element operating to disconnect the heater in a warm state.

Referring now to FIGS. 2 and 3, each of the attachment tabs 34 may be parallel to but spaced away from respective tab electrodes 22 which they overlie by a thermostat structure 40 operating to connect and disconnect one or both of the attachment tabs 34 from their respective tab electrodes 22 as a function of temperature. In this regard, each attachment tab 34 is laminated on top of a memory metal strip 42 (or bimetallic strip or the like) by means of a conductive adhesive layer 43. The memory metal strip 42 is supported away from the tab electrode 22 at its left and right edges by means of flexible insulating (dielectric) pads 44 so that a center portion of the memory metal strip 42 is spaced from the tab electrode 22 by open gap 46 when the memory metal strip 42 is warm (for example, at a positive Fahrenheit temperature).

Figure 4:
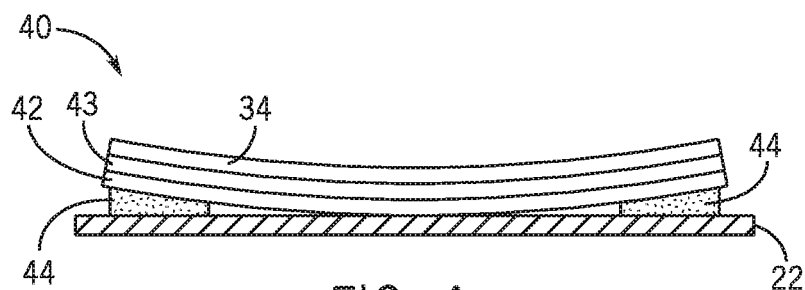
FIG. 4 is a figure similar to that of FIG. 3 showing the thermostatic control element in the cold state connecting the heater to the battery.

Referring now to FIG. 4, at subzero temperatures, the memory metal strip 42 will curve to close the gap 46 causing the memory metal strip 42 to directly contact the tab electrode 22 allowing current flow between the tab electrode 22 and the attachment tab 34 energizing the electrical resistance heater 31.

Figure 5:
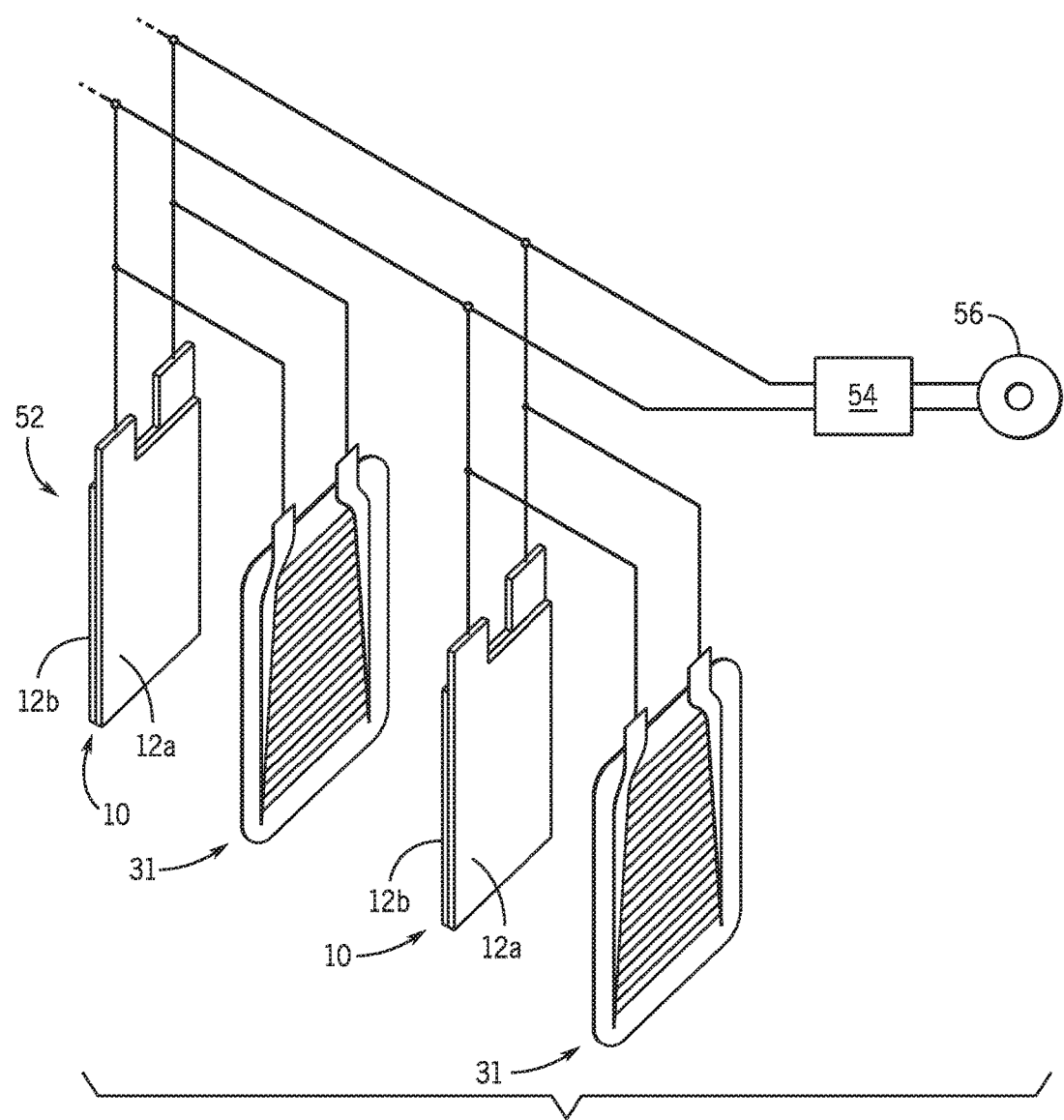
FIG. 5 is a schematic representation of the interconnection of multiple pouch cells and heaters to provide a battery system for use in a hybrid or electric vehicle.

Referring now to FIG. 5, multiple of the pouch cells 10 may be assembled together in a stack 50 providing a battery 52, the battery 52 exchanging current with a power management system 54 of the electric vehicle communicating with a motor/generator 56 to provide current to the motor and receive current from the generator. Each of the pouch cells 10 is placed in the stack 50 with its upper rectangular pouch wall 12a abutting the lower rectangular pouch wall 12b of adjacent pouch cell 10 so as to sandwich each electrical resistance heater 31 between insulating surfaces of different pouch cells 10 and to provide each pouch cell 10 with the separate thermostatically controlled heater element. The pouch cells 10 may be connected in parallel to the power management system 54 and the stack 50 placed in a housing (not shown).

Figure 6:
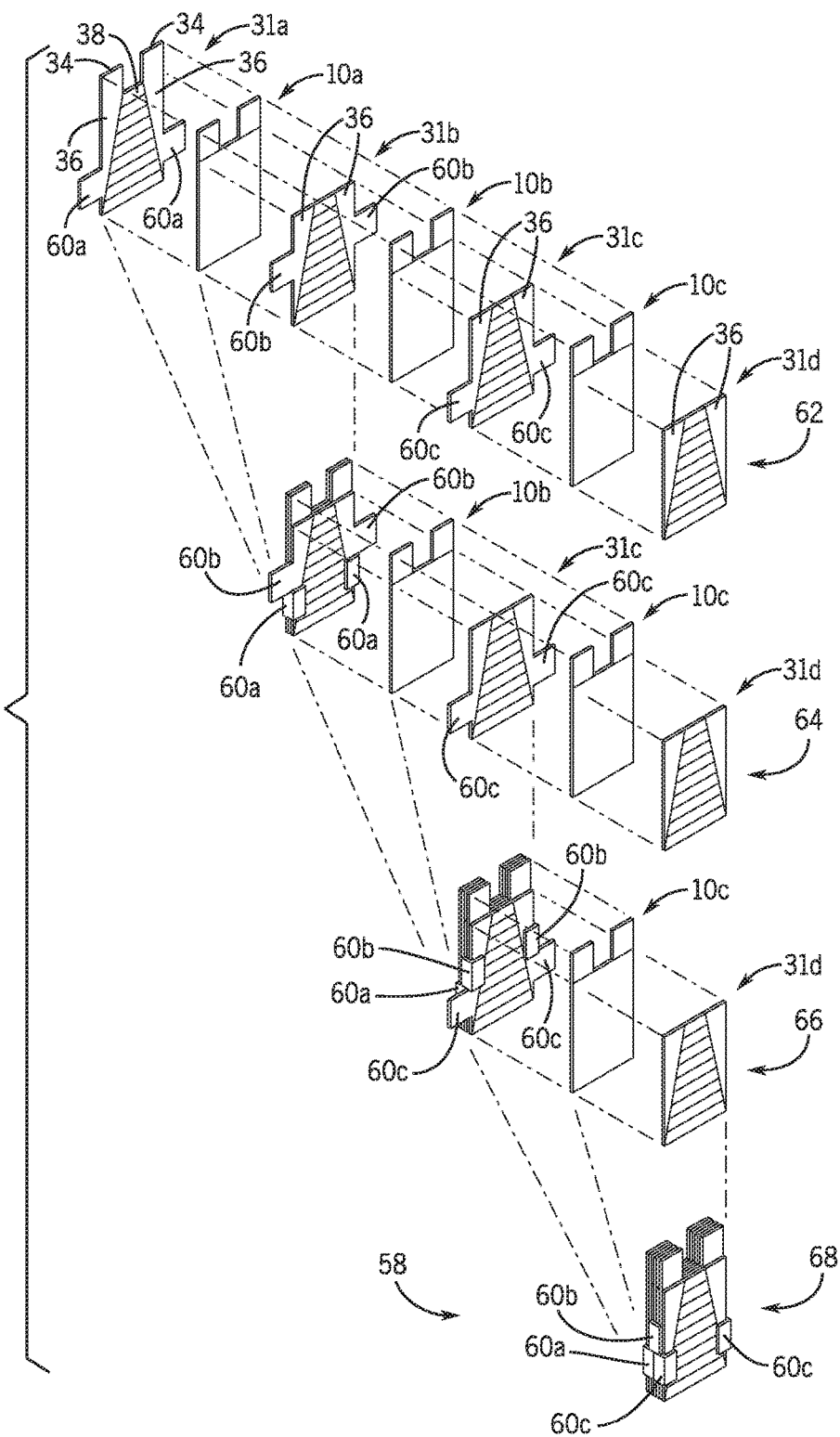
FIG. 6 is an exploded perspective view of four stages in the assembly of a three cell battery subsystem having interleaved heaters according to a second embodiment of the invention.

Referring now to FIG. 6, a multi-pouch cell subsystem 58 may be assembled from pouch cells 10a-10c interleaved with electrical resistance heaters 31a-31c. In this regard, electrical resistance heaters 31a and 31b flank opposite sides of pouch cell 10a, electrical resistance heaters 31b and 31c flank opposite sides of pouch cell 10b, and electrical resistance heaters 31c and 31d flank opposite sides of pouch cell 10c for assembly in a stack as shown in stage 62.

Electrical communication between the various electrical resistance heaters 31a-31c may be provided by conductive tabs 60 positioned in lateral left and right extensions, respectively, from the left and right power rails 36 of each of the electrical resistance heaters 31. Electrical resistance heater 31a may receive electrical power through tabs 34 as described above and may communicate that electrical power down the left and right power rails 36 to the left and right tabs 60a. As shown in stage 64, electrical resistance heaters 31a and 31b may be pressed against opposite sides of a pouch cell 10a and the tabs 60a folded around the pouch cell 10a to attach to, and to electrically communicate with, the power rails 36 of the electrical resistance heater 31a by means of a conductive adhesive material, for example, but not limited to, a pressure sensitive conductive adhesive such as an acrylic adhesive. The tabs 60a thus provide an electrical path from the tabs 34 to the left and right power rails of electrical resistance heater 31b.

Electrical resistance heater 31b may likewise have left and right extending tabs 60b (displaced upward slightly with respect to tabs 60a to prevent interference) so that when electrical resistance heater 31b and electrical resistance heater 31c are pressed against the opposite sides of pouch cell 10b tabs 60b may be folded around the pouch cell 10b to contact and conductively adhere to the power rails 36 of the electrical resistance heater 31c to provide electrical power thereto. This is shown in stage 66.

Finally electrical resistance heater 31c may likewise have left and right extending tabs 60c (displaced slightly downward with respect to tabs 60a) so that when electrical resistance heater 31c and electrical resistance heater 31d are pressed against opposite sides of pouch cell 10c, tabs 60c may be folded around the pouch cell 10c to contact and conductively adhere to the power rails 36 and around electrical resistance heater 31d to provide power thereto, as shown in stage 68.

It will be appreciated that this technique may be used with direct printing of the spanning heater conductors 38 to the pouch material with an adhesive connection between the spanning heater conductors 38 and foil that may implement the various tabs 60.

In this way, the three pouch cells 10a-10c may have electrical heat applied to both sides with power received only through a pair of tabs 34 which may provide for the thermostatic control described above reducing the cost of such thermostatic control. The tabs 60 also serve to hold and stabilize the assembly for later additional assembly operations. Alternatively, thermostatic control may be provided on each electrical resistance heater 31 for more precise temperature control.

An exposed metal surface of power rails 36 and tabs 60a for electrical resistance heater 31a are generally continuous metal conductive material and face an insulating surface of pouch cell 10a. Likewise exposed metal surfaces of power rails 36 and tabs 60b and 60c for pouch cells 10b and 10c, respectively, face insulating surfaces of pouch cells 10b and 10c, respectively.

Figure 7:
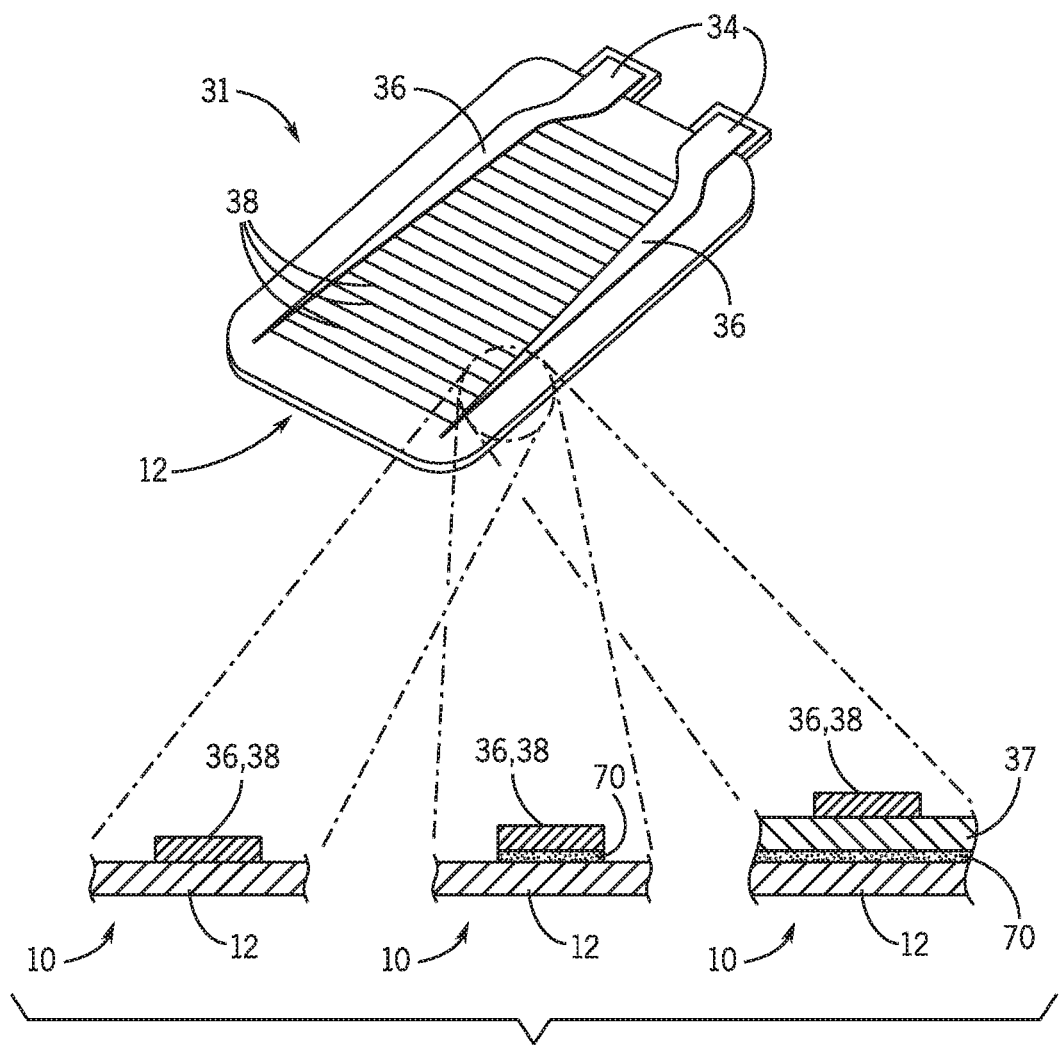
FIG. 7 is a figure similar to that of FIG. 2 showing three fabrication processes for attaching the film heater to a pouch cell.

Referring now to FIG. 7, the electrical resistance heater 31 may be attached to an upper or lower pouch wall 12 by direct printing of one or both of the power rails 36 and spanning heater conductors 38 directly on the polymer material of the pouch wall 12. This printing can use, for example, screenprinting techniques well known in the art.

Alternatively, one or both of the power rails 36 and spanning heater conductors 38 may be attached to the pouch wall 12 by means of the pressure sensitive or other type of adhesive layer 70. The adhesive layer 70 may be a conductive adhesive of the type described above. In this case, one or both of the power rails 36 and spanning heater conductors 38 may be prepared on a transfer substrate (not shown) and then applied to the pouch wall 12 for transfer in the manner of a decal.

In a hybrid system, the spanning heater conductors 38 may be printed directly on the pouch wall 12 and the power rails 36 may be adhesively applied foil members using conductive adhesive.

Alternatively, one or both of the power rails 36 and spanning heater conductors 38 may be fabricated on a supporting flexible film substrate of polymer carrier layer 37, the latter of which may then be attached by adhesive layer 72 to the pouch wall 12 of the pouch cell 10. The terminals 34 the polymer carrier layer 37 underlying the terminals 34 may be peeled back and removed prior to attachment.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

All of the publications described herein, including patents and non-patent publications, are hereby incorporated herein by reference in their entireties.

What is claimed is:

1. A battery pack assembly comprising:
   at least one pouch cell providing opposed polymeric flexible film walls defining a pouch holding a set of plates including battery electrodes and providing exposed battery terminals, the polymeric flexible film walls extending generally in parallel to the plates and separated across a narrowest dimension of the pouch cell; and
   a flexible film heater having exposed heater terminals that overlie and contact the battery terminals, the flexible film heater applied in thermal contact to the pouch cell by direct printing of a polymer positive temperature coefficient material on at least one of the polymeric flexible film walls to heat the same when a current passes between the heater terminals.

2. The battery pack assembly of claim 1 wherein the battery pack assembly includes multiple pouch cells each having an attached flexible film heater and stacked so that each pouch cell contacts a flexible film heater on both opposed polymeric film walls and so that at least one film heater contacts two adjacent pouch cells.

3. A battery pack assembly comprising:
   at least one pouch cell providing opposed polymeric flexible film walls defining a pouch holding a set of plates including battery electrodes and providing exposed battery terminals, the polymeric flexible film walls extending generally in parallel to the plates and separated across a narrowest dimension of the pouch cell; and
   a flexible film heater having exposed heater terminals that overlie and contact the battery terminal terminals, the flexible film heater applied in thermal contact to at least one of the polymeric flexible film walls to heat the same when a current passes between the heater terminals;
   wherein the battery pack assembly includes multiple pouch cells each having an attached flexible film heater and stacked so that each pouch cell is in thermal contact with a flexible film heater;
   wherein the exposed heater terminals for successive film heaters extend generally along a plane of the film heater at different locations for different film heaters so heater terminals of a first film heater may attach to the battery terminals of an adjacent pouch cell and heater terminals of other film heaters may wrap around pouch cells to attach to an adjacent film heater without contacting other heater terminals.

4. The battery pack assembly of claim 1 wherein the battery terminals are disposed along a seam between the opposed polymeric film walls to extend generally parallel to the polymeric film walls and wherein the exposed heater terminals extend along a plane of the flexible film heater to overlie and contact the battery terminals.

5. The battery pack assembly of claim 1 wherein the exposed heater terminals are flexible and coated with a conductive adhesive for attachment to the battery terminals.

6. The battery pack assembly of claim 1 wherein the film heater employs a positive temperature coefficient material.

7. The battery pack assembly of claim 1 wherein the film heater provides a thermostatic element switching current through the film heater according to a temperature of the film heater.

8. The battery pack assembly of claim 7 wherein the thermostatic element is selected from a bimetallic element and a memory metal element.

9. The battery pack assembly of claim 1 wherein the film heater provides a set of polymeric conductors extending between flanking distribution conductors extending along edges of a pouch cell in an assembled battery pack assembly and wherein the distribution conductors are flexible metallic films or foil.

10. The battery pack assembly of claim 9 wherein a width of the distribution conductors at a point along the distribution conductors is proportional to a sum of the widths of the polymeric conductors joined by the distribution conductors downstream from that point with respect to the battery terminals.

11. The battery pack assembly of claim 1 wherein the film heater provides an electrically insulating polymer film substrate to which the film heater is attached.

12. The battery pack assembly of claim 11 wherein the polymeric substrate is coated with a pressure sensitive adhesive for attachment to a polymeric film wall.

13. The battery pack assembly of claim 1 wherein the film heater provides a conductive material adhered directly to the polymeric film wall.

14. The battery pack assembly of claim 1 wherein the film heater provides a conductive printing on the polymeric film wall.

15. The battery pack assembly of claim 1 wherein the pouch cell is a lithium ion cell.

16. A method of manufacturing heated battery packs consisting of:
    at least one pouch cell providing opposed polymeric flexible film walls holding battery terminals providing exposed battery terminals, the polymeric flexible film walls extending generally in parallel to the plates and separated across a narrowest dimension of the pouch cell; and
    a flexible film heater having at least one of: exposed heater terminals that overlie and contact the battery terminals and flexible exposed heater interconnection terminals and applied in thermal contact to at least one of the polymeric flexible film walls to heat the same when a current passes between the heater terminals,
    wherein the film heater provides a set of polymeric conductors extending between flanking distribution conductors extending along edges of the film heater, the method comprising:
    (a) positioning multiple pouch cells together in a stack with intervening film heaters;
    (b) attaching heater terminals of at least one of the film heaters to battery terminals of at least one pouch cell; and
    (c) attaching heater interconnection terminals of at least one film heater to two flanking distribution conductors of another film heater by folding the flexible heater interconnection terminals around an intervening pouch cell to contact the other film heater.

17. The method of claim 16 further including the step of printing the polymeric conductors to the polymeric film of the pouch cell.

18. The method of claim 16 wherein the heater terminals have a coating of conductive pressure sensitive adhesive and wherein the attaching of the heater terminals to the battery terminals and to flanking distribution conductors makes electrical communication through the conductive pressure sensitive adhesive.

19. The method of claim 18 wherein the attachment of heater terminals to flanking distribution conductors wraps the heater terminals about an intervening pouch cell.

* * * * *